Patented Mar. 9, 1926.

1,576,105

UNITED STATES PATENT OFFICE.

JOHN T. FETHERSTON, OF CUYLERVILLE, NEW YORK.

GARBAGE-TREATING COMPOSITION.

No Drawing.  Application filed February 27, 1924. Serial No. 695,585.

*To all whom it may concern:*

Be it known that I, JOHN T. FETHERSTON, a citizen of the United States, residing at Cuylerville, in the county of Livingston, State of New York, have invented certain new and useful Improvements in Garbage-Treating Composition; and I do hereby declare the following to be a full, clear, and exact description of the invention, such as will enable others skilled in the art to which it appertains to make and use the same.

This invention relates to a composition intended and adapted for summer and winter use in retarding or controlling the decomposition and freezing of organic matter, and more particularly of waste materials such as garbage and the like. The invention also includes an improved method of treating garbage and garbage containers.

Garbage is waste organic matter resulting from the preparation and use of food. In towns and cities garbage is usually placed by the housewife or servant in a galvanized iron can or receptacle fitted with a cover. The can is filled in or from the kitchen and generally placed outside the building for removal and disposal by contractors or by the municipal authorities at more or less regular intervals, varying from a day to a week. In hot weather garbage decomposes, ferments, or putrefies, giving rise to objectionable odors, which escape when the cover is removed, in the case of a close-fitting cover, or which may escape more or less freely where the cover or the pail, due to abuse, becomes injured or deformed so that the cover no longer fits closely. In hot weather garbage also offers a favorable breeding place for maggots and flies. Vehicles carrying garbage or like organic waste materials through the streets or to a place of final disposition are more or less public nuisances through the dissemination of malodors and flies. In cold weather, ordinary garbage may freeze and then it may be difficult to remove from the can and may require removal by battering, pounding, picking, or forceful separation, with resulting injury, damage or destruction of the can.

The fermentation and putrefaction of garbage and like organic materials which result in the production of objectionable odors proceeds rapidly in a warm, closed vessel in the partial absence of oxygen under the action of anaerobic bacteria, while the development of maggots and especially flies similarly proceeds rapidly in such a warm, closed vessel; so that the ordinary garbage can with a closely fitting cover, as well as one with a loosely fitting cover, is an effective incubator for the evolution of objectionable odors and products of which the common house-fly is the most dangerous from a health standpoint.

In endeavoring to cure or minimize the evils of the garbage can or container, they are sometimes washed with hot or cold water, but this does not overcome the objectionable features above mentioned during the period of time when the garbage collects and remains in the receptacle, and particularly where it remains for a sufficient length of time for the breeding of maggots and flies and the development of considerable amounts of objectionable odors.

The object of the present invention is to provide a composition or garbage fixer which will prevent or retard or control the evil consequences incident to the handling, storage and transportation of garbage and similar materials, and an improved method of treating garbage and garbage containers therewith.

The composition of the present invention comprises essentially an intimate mixture of salt (sodium chloride) and an ingredient or ingredients imparting non-moisture absorbing properties to the salt and increasing the value of the composition for treating garbage and garbage containers. Among the ingredients which may be compounded with the salt are chloride of lime, sodium silicofluoride, unslaked lime, slaked lime, soda ash, activated carbon and charcoal. Of these ingredients, the one which is particularly advantageous is unslaked lime or quick lime (calcium oxide), which has the property of absorbing moisture and neutralizing organic acids and otherwise retarding the decomposition of the garbage and protecting the garbage container. Other ingredients may also be combined in the composition to further improve it.

The improved composition of the present invention comprising salt and unslaked lime has proven to be a most efficient preservative or stabilizer or fixer of garbage, while it can also be kept in a fine pulverulent form without showing the lumping or caking tendency of salt alone.

The salt and calcium oxide are also advantageously combined with other germicides.

disinfectants and fly repellents, while coloring materials and odorous substances may also be included in small amount.

The salt used in the composition may be one of the relatively inexpensive grades of commercial rock salt, although purer grades of sodium chloride, as well as less pure grades of salt may be employed. While the fineness of the salt is not of controlling importance, it is desirable that it should pass an eight mesh screen. In general, the finer the ingredients of the mixture, the more uniform is the mixture and the more available and active the several constituents. The composition is, therefore, advantageously prepared in a finely divided or pulverulent form or with the particles of a sufficient degree of fineness that the composition and its components can be readily disseminated throughout the mass of garbage. The salt accordingly should be in such a form that it will dissolve readily in the liquid or water content of the garbage in order that its maximum efficiency as an antiseptic or germicide may be utilized. The salt also has the advantage of lowering the freezing temperature of the garbage and thus reducing its tendency to freeze together or to the bottom and sides of the can, and making its removal easier in cold weather, thereby minimizing danger to the container attendant on the removal of frozen garbage.

The calcium oxide should also be in a relatively finely divided state in admixture with the salt. It is preferable to make use of burned, unslaked lime ground so that it will pass a twenty-mesh screen and without removing the fines. Any of the commercial grades of lime may be used. The lime may be low in magnesia or it may be high in magnesia. With high magnesia lime, a somewhat increased proportion is desirable to secure a corresponding effect.

The lime in the composition supplements the action of the salt and acts as a stabilizer or fixer for the garbage by reason of its germicidal properties. It also serves to prevent the composition from caking due to the hygroscopic tendency of the salt. In addition, it aids in preventing the formation and escape of objectionable odors and serves to neutralize any acids which may be formed or which may be present in the garbage. It also neutralizes any acid which may be produced due to the hydrolysis of the salt present and thus serves to protect the garbage container from the rusting or corrosion which might result from the action of the salt or from acids formed during the putrefying process.

The mixture of salt and lime can be further improved and its action in preventing the breeding of flies, insects and vermin made more effective, by incorporating therein relatively small amounts of other disinfecting substances, preferably those which do not have an unpleasant odor. Creosote, for example, can be incorporated in small amount, or in any amount desired, and the disinfecting action of the composition improved without lessening the stabilizing or fixing activity of the composition. An amount of creosote corresponding to 0.5% can thus be added to a composition containing salt and lime in the proportions of about 90 parts of salt and 10 of lime.

The composition can be further improved by incorporating therein a repellent to flies and insects, thus lessening the probability that eggs will be laid in the garbage. Fly repellents such as oil of citronella may advantageously be added in small amount, or other essential oils possessing similar properties may be employed. Such a constituent also has the advantage of imparting to the mixture a characteristic and pleasant odor.

The composition can also be provided with a distinctive color, although this is not necessary in its action or use as a garbage preservative or stabilizer or fixer. Inorganic pigments and organic dyes are suitable for imparting such a distinctive color. Ultramarine, for example, can be used to give a distinctive color, or other pigments may be employed, depending upon the color to be imparted to the composition.

The proportions of the lime and salt can be varied, but the salt is advantageously used in preponderating proportions, and the lime in relatively less proportions. A composition containing an intimate mixture of 90 parts of salt and 10 parts of calcium oxide, in a finely divided and intimately admixed condition, is an advantageous composition for use for the purposes described; and such a composition can be further improved by the addition of other ingredients, such as those above mentioned.

The invention will be further illustrated by the following specific example illustrating an embodiment of the invention and a specific composition which has proved effective in an extended series of tests, but it will be understood that the invention is not limited to this specific example nor to the specific ingredients mentioned, excepting that sodium chloride and calcium oxide constitute the basis of the composition.

| | Parts. |
|---|---|
| Sodium chloride | about 89.5 |
| Unslaked lime | " 9.5 |
| Creosote | " 0.5 |
| Oil of citronella | " 0.1 |
| Ultramarine | " 0.4 |

From this specific example it will be seen that the invention comprises a composition made up essentially of sodium chloride and calcium oxide (unslaked lime); and that the composition may also advantageously contain relatively small amounts of suitable disinfectants, fly-repelling substances, etc.

It will also be seen from the foregoing description that the invention provides an improved composition of matter, having important advantages for use as a garbage stabilizer or fixer; it is sufficiently cheap for extensive use and is effective in keeping the garbage can clean, odorless, fly-less, non-freezing and non-rusting. The composition, moreover, is non-poisonous and will tend to keep the garbage fresh, so that it is more valuable for the reclamation therefrom of grease and other valuable by-products which might otherwise be lost or changed through chemical decomposition or bacterial action.

In carrying out the improved process of the invention, the composition is scattered or sprinkled in the bottom and around the sides of the ordinary household garbage can before the garbage is placed therein. When the garbage is emptied from the can, the bottom and side walls that have been in contact with the garbage will reamin moist. When the new composition is sprinkled or scattered over the moist side walls and bottom it will adhere thereto and will in part at least dissolve in this moisture, forming a brine solution, and the lime will improve the adhesiveness of the composition to the moist wall and will serve to neutralize any organic acids present in the residual moisture. Such residue from the garbage as remains in the can is thus subjected to the action of the composition before fresh amounts of garbage are introduced into the can. If the fresh garbage were introduced into the can while it was still odorous from the preceding garbage and while it contained residues thereof which had undergone decomposition, these residues would contaminate the fresh garbage and immediately promote decomposition thereof. The treatment of the garbage container according to the present invention protects the fresh garbage from such contamination.

The amount of the composition required will vary with garbage cans of different sizes, but in general a handfull of the composition or ¼ to ½ pound scattered in the bottom and around the sides of the ordinary household garbage can will be sufficient, this being sprinkled or scattered after the garbage has been emptied and while the can is still moist from the garbage. The walls of the garbage container are thus kept moist and clean and the garbage can be readily removed without the necessity of banging or battering the can. That is, the treatment of the can with the new composition prevents the garbage from sticking to the can and insures easy emptying of the can, and the maintenance of the can in a sufficiently clean state to overcome or greatly reduce the garbage nuisance.

A small amount of the composition can also be scattered or sprinkled on top of the garbage or on top of further amounts of garbage when introduced into the can, and this is particularly advantageous in warm weather.

It will be evident that the composition of the present invention can be used in the treatment of other materials than garbage where its properties and advantages adapt it for such use, as in the treatment of other organic matter such as night soil, sewage, manure, offal and similar organic material; but I consider the new composition particularly advantageous when unslaked lime is used as an ingredient thereof and when the composition is used in the treatment of garbage and garbage containers in accordance with the process of the invention.

I claim:

1. A composition for treating garbage, and the like in the form of a pulverulent mixture comprising essentially salt and an ingredient having the properties of neutralizing organic acids, the salt being present in preponderating amount.

2. A composition for treating garbage, and the like in the form of a pulverulent mixture comprising essentially salt and an ingredient having the properties of imparting non-moisture absorbing properties to the salt and of improving the adhesiveness and deodorizing action when applied to the moist walls of an emptied garbage container.

3. A composition for treating garbage, and the like in the form of a pulverulent mixture comprising essentially unslaked lime and salt, the salt being present in preponderating amount.

4. A composition for treating garbage, and the like in the form of a pulverulent mixture comprising essentially unslaked lime and salt, the salt being present in preponderating amount and said composition also containing a small amount of a disinfectant having a distinctive odor.

5. A composition for treating garbage, and the like in the form of a pulverulent mixture comprising essentially unslaked lime and salt, the salt being present in preponderating amount and said composition also containing a small amount of a disinfectant having a distinctive odor, and a small amount of an insect repellent.

6. A composition for treating garbage, and the like in the form of a pulverulent mixture comprising essentially unslaked lime and salt, the salt being present in preponderating amount and said composition also containing a small amount of a disinfectant having a distinctive odor, a small amount of an insect repellent, and also containing a small amount of coloring material giving the composition a distinctive color.

7. A composition for treating garbage, and the like in the form of a pulverulent mixture comprising essentially about 90 parts of salt and 10 parts of unslaked lime.

8. The method of treating garbage containers which comprises sprinkling or scattering over the moist walls of the container a pulverulent composition comprising essentially salt and an ingredient having the properties of neutralizing organic acids.

9. The method of treating garbage containers which comprises sprinkling or scattering over the moist walls of the container a pulverulent composition comprising essentially salt, and an ingredient improving the adhesiveness of the composition and the deodorizing properties of the composition.

10. The method of treating garbage containers which comprises sprinkling or scattering over the moist walls of the container a pulverulent composition comprising essentially unslaked lime and salt, the salt being present in preponderating amount.

11. The method of treating garbage containers which comprises sprinkling or scattering over the moist walls of the container a pulverulent composition comprising essentially unslaked lime and salt, the salt being present in preponderating amount and said composition also comprising a small amount of a disinfectant having a distinctive odor.

12. The method of treating garbage containers which comprises sprinkling or scattering over the moist walls of the container a pulverulent composition comprising essentially unslaked lime and salt, the salt being present in preponderating amount and said composition also comprising a small amount of a disinfectant having a distinctive odor and a small amount of an insect repellent.

13. The method of treating garbage which comprises sprinkling or scattering over the garbage in a garbage container a pulverulent composition comprising essentially salt and an ingredient having the properties of neutralizing organic acids, the salt being present in preponderating amount.

14. The method of treating garbage which comprises sprinkling or scattering over the garbage in a garbage container a pulverulent composition comprising essentially salt and unslaked lime, the salt being present in preponderating amount.

In testimony whereof I affix my signature.

JOHN T. FETHERSTON.